United States Patent
Johnston et al.

(10) Patent No.: US 7,270,146 B1
(45) Date of Patent: Sep. 18, 2007

(54) AIR VENT VALVE

(75) Inventors: Wilhelmina E. E. Johnston, 1717 Avenida Del Sol, Boca Raton, FL (US) 33432; Ian Fraser Johnston, Boca Raton, FL (US)

(73) Assignee: Wilhelmina E. E. Johnston, Boca Raton, FL (US)

( * ) Notice: Subject to any disclaimer, the term of this patent is extended or adjusted under 35 U.S.C. 154(b) by 0 days.

(21) Appl. No.: 11/639,930

(22) Filed: Dec. 15, 2006

(51) Int. Cl.
*E03C 1/122* (2006.01)
*F16K 24/06* (2006.01)

(52) U.S. Cl. .................................. 137/526; 137/533.19

(58) Field of Classification Search ................ 137/526, 137/532, 533.19; 4/211, 219
See application file for complete search history.

(56) References Cited

U.S. PATENT DOCUMENTS

| | | | | |
|---|---|---|---|---|
| 1,628,069 A | * | 5/1927 | Schmidt et al. | 137/526 |
| 2,068,248 A | * | 1/1937 | Schroeder | 137/526 |
| 2,511,435 A | * | 6/1950 | Griswold | 137/526 |
| 2,520,771 A | * | 8/1950 | Martin et al. | 137/533.19 |
| 2,928,413 A | * | 3/1960 | Hansen | 137/526 |
| 4,436,107 A | * | 3/1984 | Persson | 137/526 |
| 4,518,014 A | * | 5/1985 | McAlpine | 137/526 |
| 4,556,084 A | * | 12/1985 | Frawley | 137/526 |
| 5,419,366 A | | 5/1995 | Johnston | |
| 5,441,679 A | | 8/1995 | Chalich | |
| 5,803,112 A | * | 9/1998 | Andersson | 137/526 |
| 6,234,198 B1 | | 5/2001 | Chalich | |
| 6,415,816 B1 | * | 7/2002 | Beckey et al. | 137/526 |
| 6,532,988 B1 | * | 3/2003 | Ericson | 137/526 |
| 2001/0050106 A1 | * | 12/2001 | Turker et al. | 137/533.19 |
| 2006/0011239 A1 | * | 1/2006 | Stone | 137/526 |

FOREIGN PATENT DOCUMENTS

EP  409506 A1 *  1/1991  ................ 4/219

* cited by examiner

*Primary Examiner*—John Rivell
(74) *Attorney, Agent, or Firm*—Charles J. Prescott

(57) ABSTRACT

An air admittance valve assembly for venting ambient air into a system while preventing the escape of gases within the system. A housing includes first and second passageways in fluid communication through a valve seat therebetween. A flat generally thin, flexible, preferably resilient free-floating sealing membrane is positioned for sealing engagement by gravity only atop the valve seat. Ambient air in the second passageway will freely flow into the first passageway and the system at system air pressure less than atmospheric pressure while air within the system is prevented from flowing outwardly therefrom through the valve assembly.

6 Claims, 5 Drawing Sheets

AIR VENT VALVE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to air admittance valves for plumbing systems and more particularly to a one-way valve designed to allow air to enter the plumbing drainage system when a pressure less than atmospheric pressure develops.

2. Description of Related Art

Individual and branch-type air admittance valves for sanitary drainage systems are devices used as vent terminals in plumbing drainage systems. These valves are not used to relieve backpressure, but to allow air to enter the system when even a slight negative internal pressure occurs. When the valve of the type of the present invention is installed in a building, at least one open vent terminal which extends to atmosphere outside of the building serves the same building drain on which these valves are installed. Therefore, the valves are designed to be used for individual fixtures or for a branch serving multiple fixtures.

Typical plumbing systems introduce water and carry away waste, the water being supplied under pressure to the plumbing fixtures and drain pipes carry waste and water from the fixtures to a drain emptying into sewer systems or septic tanks or the like. Atmospheric pressure is maintained in the system and gases are vented by vent pipes that open to the outside. Plumbing fixtures typically contain a trap which holds water to prevent gases from entering the building through the fixture. Such venting allows air to enter the system to prevent a vacuum from forming. Common procedure in building plumbing systems is to utilize roof vent pipes for providing air when negative pressures are realized in drain plumbing systems.

Related air vent valves include U.S. Pat. No. 6,234,198 to Chalich which teaches a combined vacuum relief and pressure containing valve assembly for relieving vacuum in conduits, while also serving as a check valve preventing elevated pressures from propelling fluids past the valve. Beckey, et al. teaches a one-way flow valve assembly comprised of a valve body having an internal valve chamber in communication with the ambient environment with a valve seat. The primary object of Beckey's U.S. Pat. No. 6,415,816 patent provides for an automatic air admittance valve which permits ambient air under ambient pressure to enter and equalize a negative pressure differential in a plumbing drain, while preventing the discharge of gases under positive pressure conditions.

In U.S. Pat. No. 5,419,366, Johnston teaches a valve assembly for automatic venting of excess negative pressure in a drain line. An elastomeric diaphragm is drawn against a valve plate having a passageway therethrough which is normally closed by the diaphragm and, at a predetermined differential pressure across the diaphragm, causes the diaphragm to lift away from the plate to open the passageway.

There is a need in the industry for a valve containing a movable diaphragm which quickly and reliably seats and seals air flow when closed and allows air to enter when open. The valve of the present invention includes a housing which contains a movable free-floating diaphragm which seats and seals air flow when closed and allows outside or ambient air to enter when open.

BRIEF SUMMARY OF THE INVENTION

This invention is directed to a one-way air admittance valve assembly for venting ambient air into a system while preventing the escape of gases within the system. A housing includes first and second passageways in fluid communication one to another and a valve seat defining an opening demarking the first and second passageways. A cap is sealingly engaged or engageable with an upper end of the housing to define an upper portion of the first passageway and being positioned above the valve seat. A flat generally thin flexible unsupported sealing membrane is positioned for sealing by gravity only atop the valve seat, the sealing membrane being sized to slidably fit within the upright side wall of the housing which, in combination with the cap, defines the upper portion of the first passageway wherein an uninterrupted sealing area located centrally on the sealing membrane remains in alignment over the valve seat. Ambient air in the second passageway will freely flow into the first passageway and the system at system air pressure less than atmospheric pressure while air within the system is prevented from flowing outwardly therefrom through the valve assembly.

It is therefore an object of this invention to provide an improved one-way air admittance valve for venting ambient air into a system while preventing the escape of gases from the system through the valve.

Yet another object of this invention is to provide an improved air admittance valve for waste disposal systems which quickly responds to admit ambient air into the system responsive to negative system internal pressure while preventing noxious gases from being emitted from the system into the building.

Yet another object of this invention is to provide a free-floating sealing member with an air admittance valve which responds more quickly and more positively to both seal the valve from outward flow of gases from the system while allowing the free inlet of ambient air into the system as required to balance internal and ambient atmospheric pressures.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
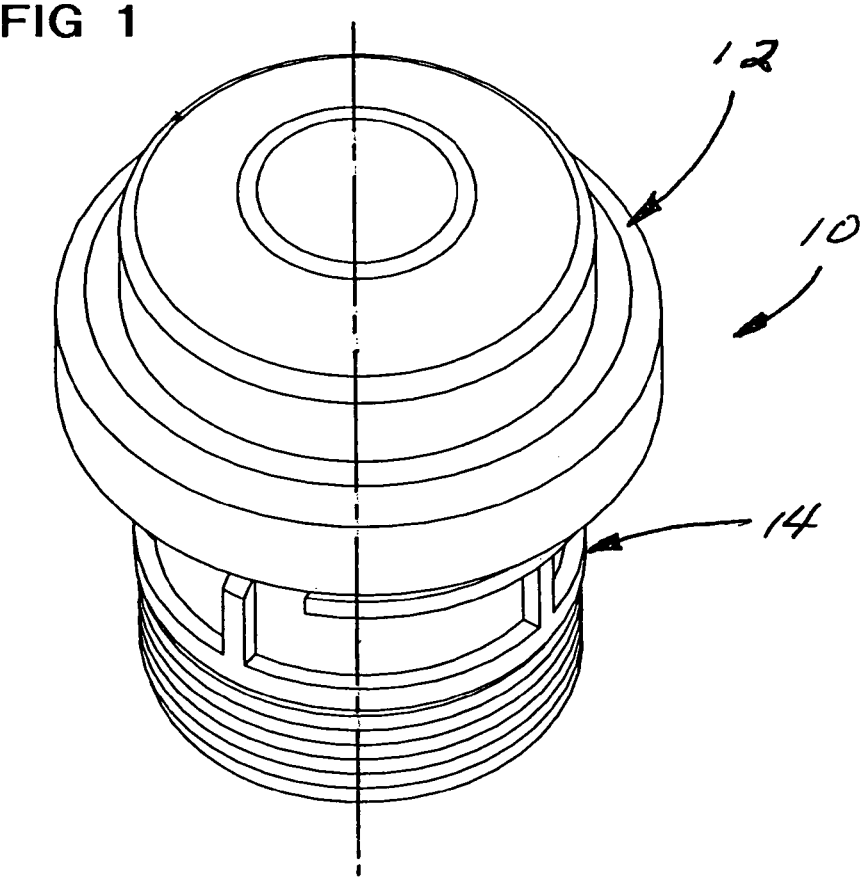
FIG. 1 is a perspective view of the valve assembly of the present invention.

Referring now to the drawings, and firstly to FIGS. 1 to 4, the preferred embodiment of the invention is there shown generally at numeral 10 and includes a plastic molded cap 12 and a plastic molded housing 14. The cap 12 sealingly engages over the outer smooth cylindrical barrel 20 of housing 14 preferably assisted in airtight sealing therebetween by O-ring 38 fitted into annular groove 36.

The housing 14 includes external threads 18 formed on a lower portion thereof for connection to a conduit forming a part of a system for waste evacuation. The lower flanges of the cap 12 includes inward projections 48 which create spaces for engagement on either side of locking tabs 49 which prevent inadvertent rotation of the cap 12 when sealingly engaged over the housing 14.

Figure 2:
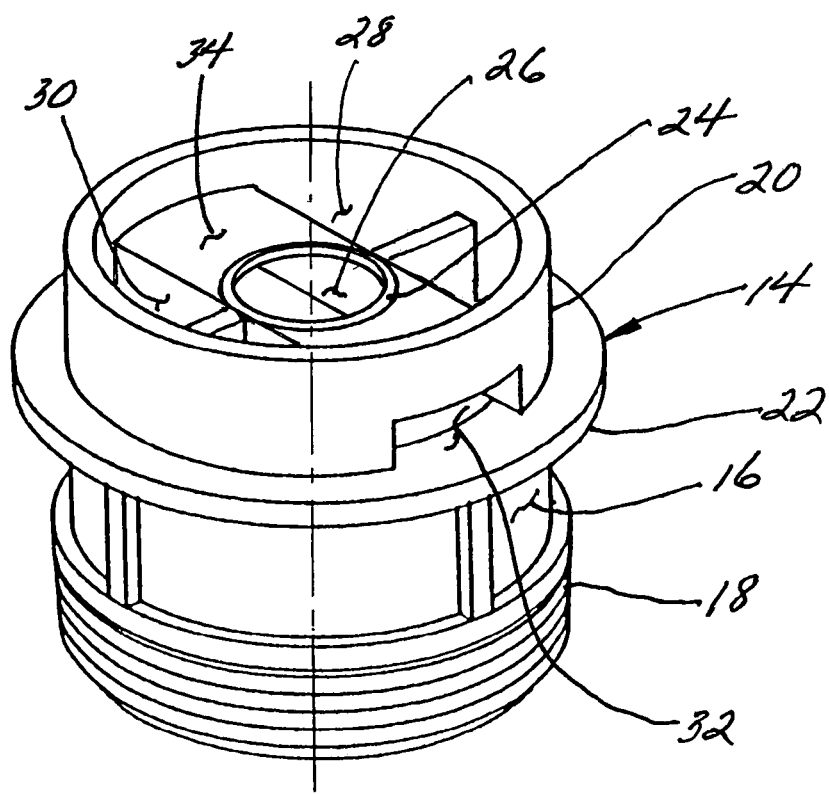
FIG. 2 is a perspective view of FIG. 1 with the cap removed.
Figure 3:
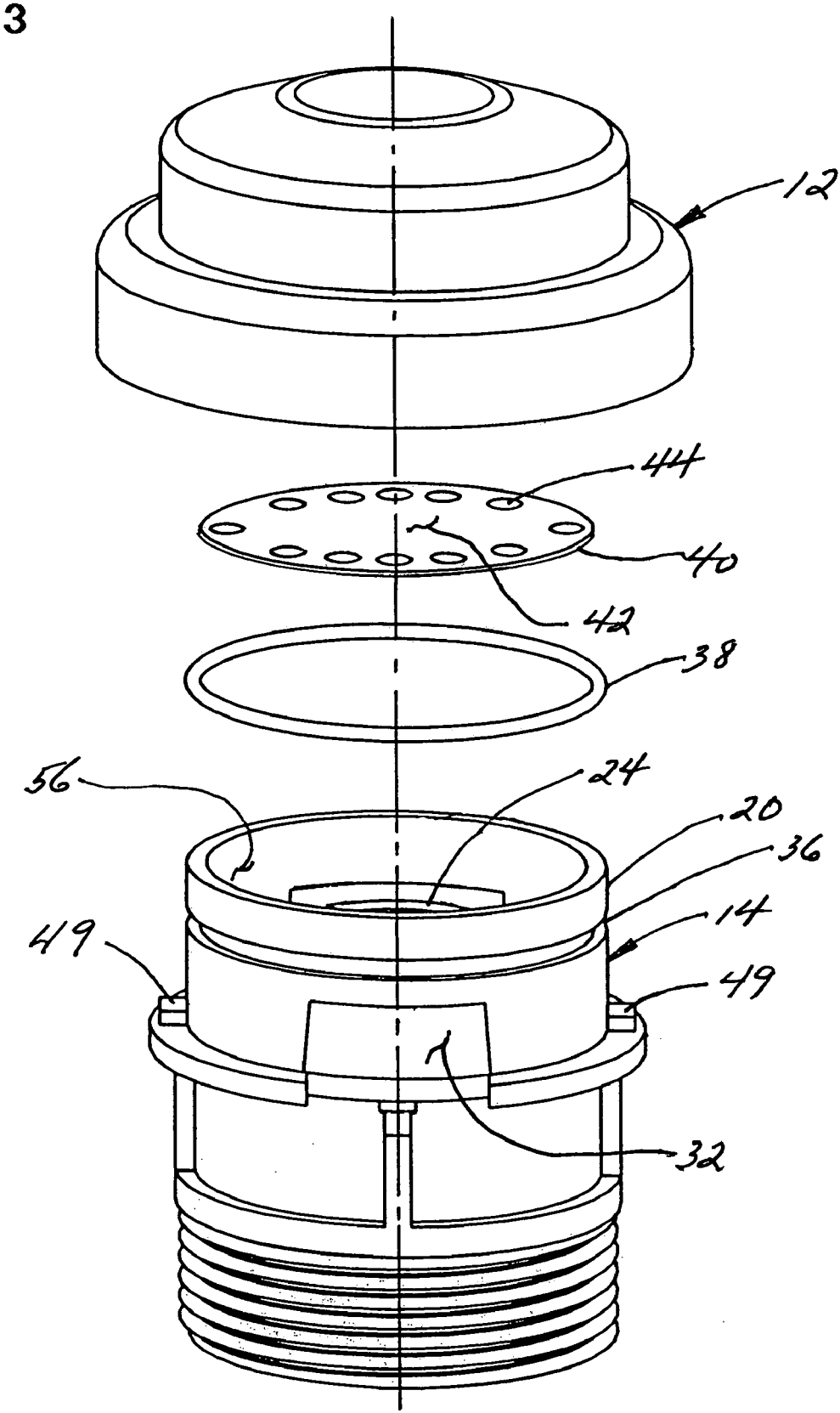
FIG. 3 is an exploded view of FIG. 1.
Figure 4:
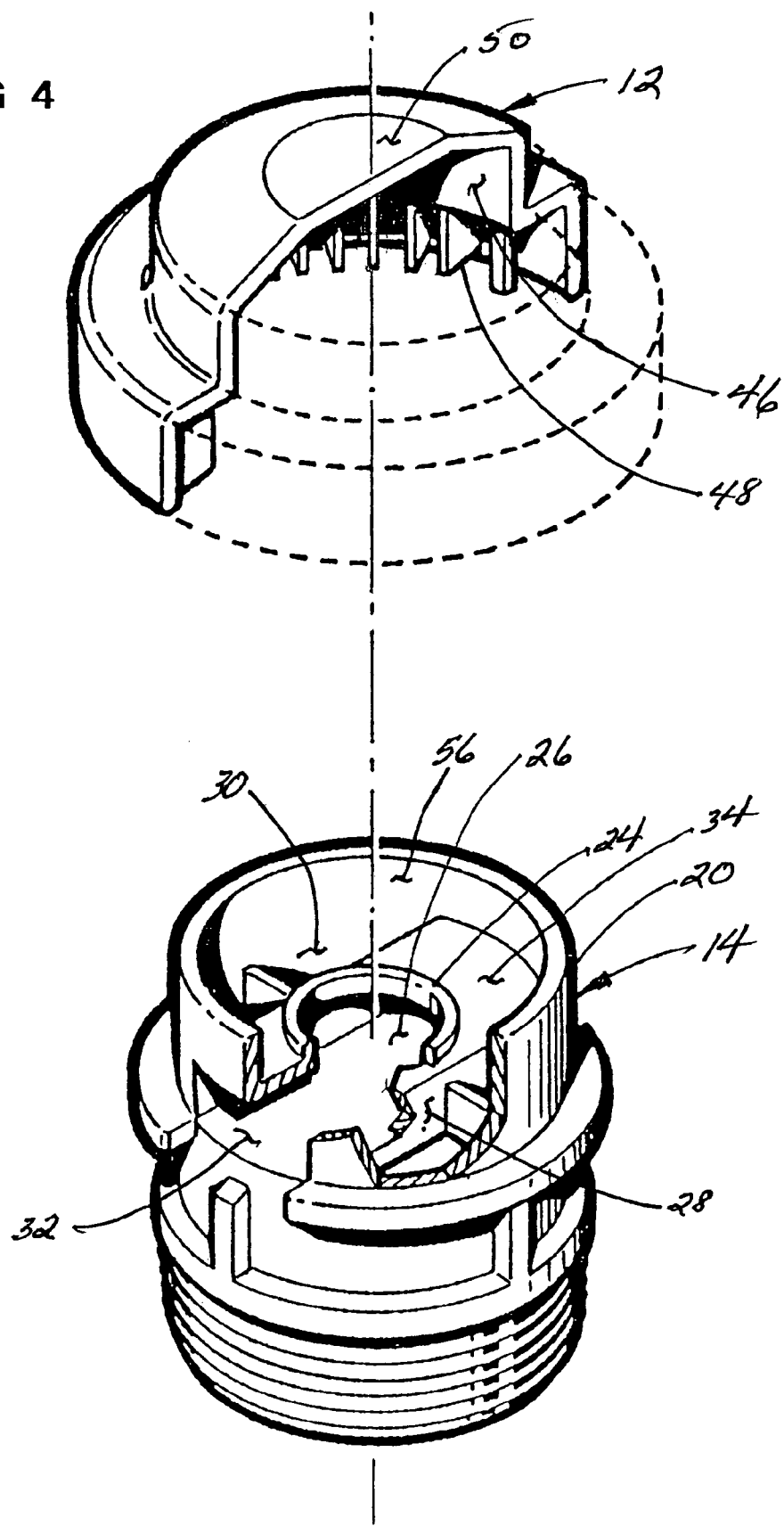
FIG. 4 is an exploded broken view of the cap and housing of FIG. 3.
Figure 5:
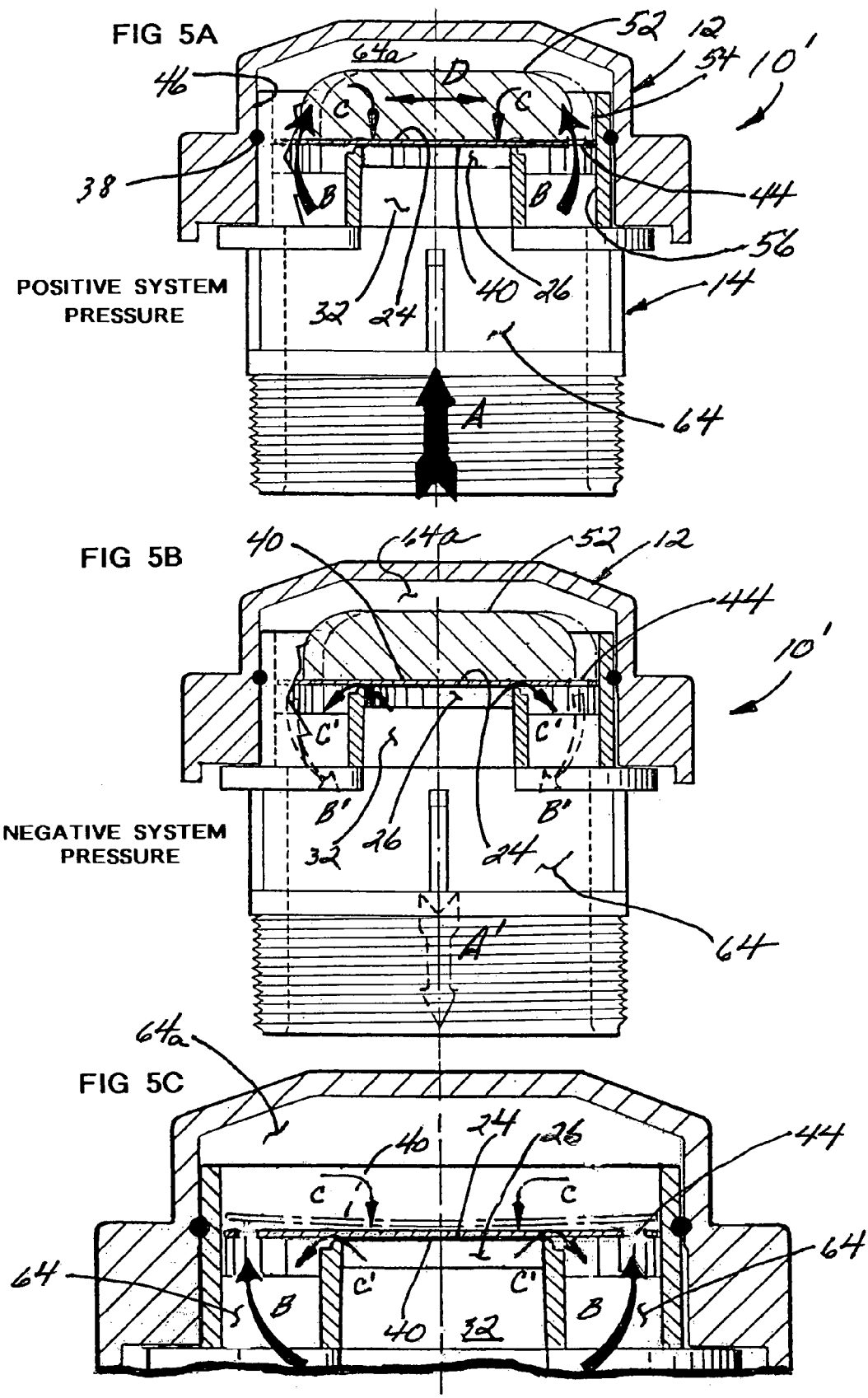
FIG. 5A is a side elevation broken section view of another embodiment of the invention shown responsive to positive pressure within a system.
FIG. 5B is a view of FIG. 5A in an ambient air admittance mode responsive to negative pressure within the system.
FIG. 5C is an enlarged section view of the upper portion of the valve assembly of FIG. 1 demonstrating both modes of operation shown in FIGS. 5A and 5B.

As seen in FIGS. 5A to 5C, the lower inner portion of the housing 14 forms and defines a first air passageway 64, an intermediate portion of which is formed by side openings 28 and 30 as best seen in FIGS. 2 and 4. This first passageway 64 is further defined at an upper portion thereof between the cap 12 and the housing 14 at 64a. A second passageway is defined by a transverse air passageway 32 which extends across the upper central part of the housing 14 and is open to ambient air at the ends thereof.

The first and second passageways 64/64a and 32 are demarcated by an air opening 26 defining a preferably circular valve seat 24 formed through the central top panel of the second passageway 32. This valve seat 24 may have a broad array of cross sectional configurations, the valve seat 24 preferably having a generally radiused upper surface which may also be of a wider nature or may also be sharpened by modifying the radiused section into an upwardly pointing triangular section or having a knife edge configuration as desired.

Figure 6:
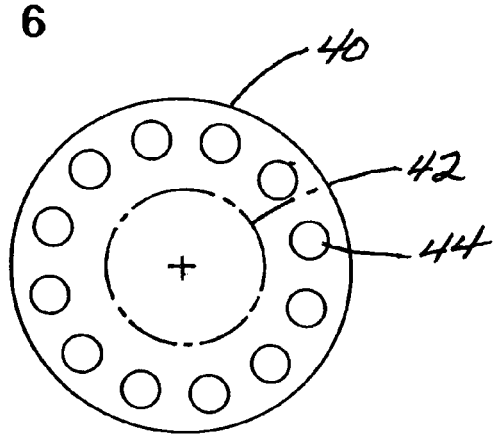
FIGS. 6 to 11 depict various embodiments of the sealing membrane of the present invention.
Figure 7:
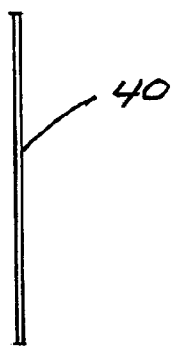
Figure 8:
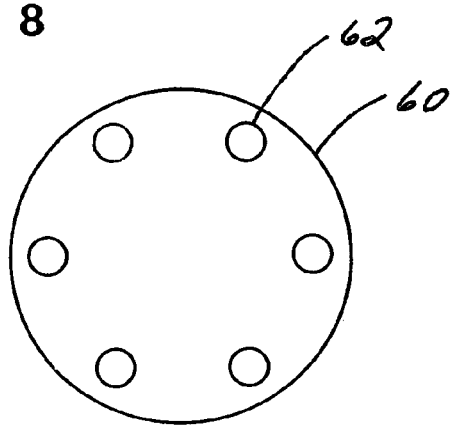
Figure 9:
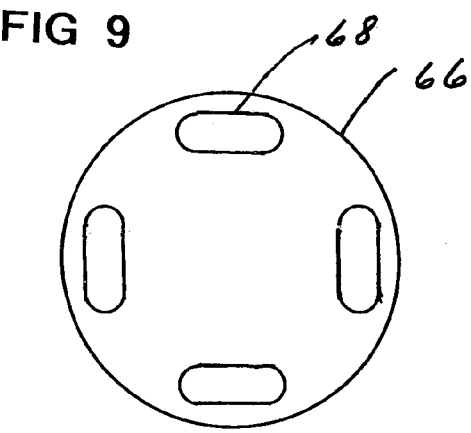
Figure 10:
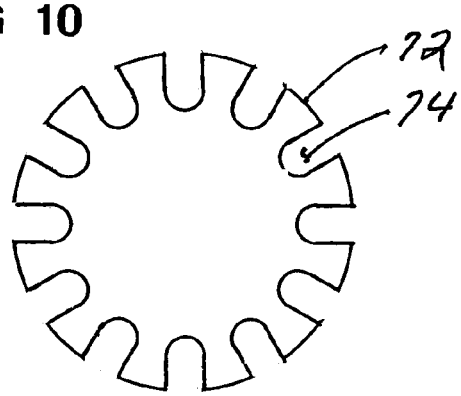
Figure 11:
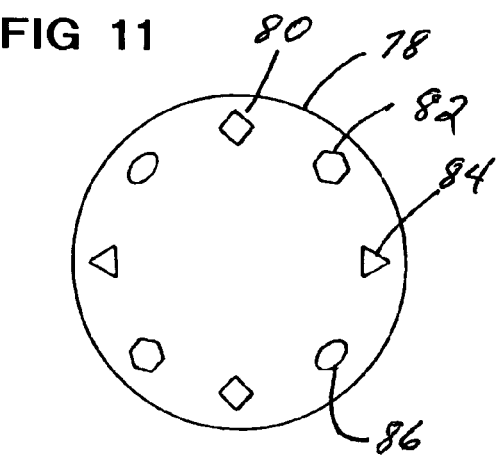

A sealing membrane 40 rests atop the valve seat 24 and is preferably formed of flat neoprene, silicone or gum rubber sheet material having a uniform thickness of between 0.02" to 0.08". The preferred embodiment of this sealing membrane 40 as also seen in FIGS. 6 and 7, includes closely and evenly spaced apertures 44 formed therethrough which facilitate inlet air flow as described herebelow. The outer peripheral diameter of the sealing membrane 40 is only slightly smaller in diameter than the cylindrical inner surface 56 of housing 14, that difference in diameter being preferably in the range of about 0.03" to 0.05" such that sealing area 42 seen in FIG. 6 remains overlapped and centered over the valve seat 24 regardless of lateral movement of the sealing membrane 40.

The valve 10 is intended for use in a system wherein the valve 10 is maintained at a fixed upright orientation as shown in the Figures. The present invention capitalizes on this fixed orientation by alternately relying only upon gravity to maintain the sealing membrane 40 in a sealed relationship resting atop the valve seat 24 by virtue of only the relatively small weight of the sealing membrane 40. At 0.028" thick, the preferred embodiment of the sealing membrane 40 fabricated of flexible, resilient sheet material such as nitrile (Buna), EPDM or neoprene is in the range of 1.0 g. The preferred feature of resiliency enhances sealing against the valve seat 24, especially so if they are irregularities in the valve seat 24. By providing the small clearance between the periphery of the sealing membrane 40 and the cylindrical inner surface 56 of housing 14, complete sealing reliability has been achieved.

Referring specifically to FIGS. 5A, 5B and 5C, when positive air pressure shown at arrow A is present in the first passageway 64/64a in FIG. 5A, that positive air pressure above ambient or atmospheric pressure is transmitted at arrow B through the apertures 44 into the upper portion 64a of the first passageway 64 and is exerted downwardly in the direction of arrow C against the sealing membrane 40 to effect positive sealing against the valve seat 24. As a result, virtually no airflow is experienced through the opening 26 for outward discharge through the second passageway 32.

In this embodiment 10' of the invention, an additional sealing weight 52 is also provided. This sealing weight 52 may be formed of any weighted material and may be rubber encapsulated as desired. The important features of this sealing weight 52 is that the outer peripheral diameter be such that, when it inadvertently is moved laterally in the direction of arrow D positioned atop the sealing membrane 40, it will contact the inner cylindrical surface 56 of housing 14 as shown in phantom in FIG. 5A at 54 and will remain in weighted contact against the sealing membrane 40 over the entire diameter or periphery of the valve seat 24. The preferred range of weight of this sealing member may be in the range of 2 to 12 g.

Referring to FIG. 5B, the mode of operation of the valve 10' with the added sealing weight 52 for additional insurance of reliability of this valve 10'is shown with the system experiencing a negative or below atmospheric pressure indicated by arrow A' within first passageway 64 and air must be introduced into the system to avoid emptying of toilet bowls or other standing water within the system. The negative pressure within the system is felt at C' through apertures 44 and the upper portion 64a of the first passageway which causes ambient air to be drawn inwardly through the second passageway 32 and upwardly through opening 26 in the direction of arrows C'. Once the negative pressure at A' is neutralized to atmospheric pressure, the sealing membrane 40 reseals automatically against the valve seat 24 as previously described.

Referring now to FIGS. 8 to 11, alternate embodiments of the sealing member are thereshown. Sealing membrane 60 includes spaced circular apertures 62 similar to that incorporated into sealing membrane 40 except that these apertures 62 are further spaced apart and reduced in number. Sealing membrane 60 includes elongated slotted apertures 68 evenly spaced at 90° one to another while the sealing membrane 78 depicts a variety of aperture shapes at 80, 82, 84 and 86 which are shown only by example and not intended to be limiting with respect to the configuration of this feature of the invention. Moreover, inwardly extending slots 74 of sealing membrane embodiment 72 will also function to serve the dual preferred needs of the sealing member to allow ambient air to quickly pass into the valve and system while facilitating the vary minimal amount of airflow from the system into the upper first passageway 64a to effect quick sealing and prevention of air outflow from the system into the building.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A one-way air admittance valve assembly for venting ambient air into a system while preventing the escape of gases within the system, comprising:
    a housing having first and second passageways in fluid communication one to another and a valve seat defining an opening demarking said first and second passageways;
    a cap sealingly engaged or engageable with an upper end of said housing defining an upper portion of said first passageway and being positioned above said valve seat;
    a flat generally thin, flexible, resilient sealing membrane positioned atop said valve seat for sealing thereof by gravity only;
    said sealing membrane being sized to freely slidably fit within the upright side wall of said housing which, in combination with said cap, defines said upper portion of said first passageway wherein an uninterrupted sealing area located centrally on said sealing membrane remains in alignment over said valve seat as said sealing membrane is moved freely by air flowing within said upper portion of said first passageway;
    whereby ambient air in said second passageway freely flows into said first passageway and the system through said opening when air pressure in the system is less than atmospheric pressure;
    said sealing member including spaced apertures formed therethrough positioned between the sealing area and a periphery of said sealing member for enhancing system airflow into said upper portion of said first passageway to seal said sealing member against said valve seat to prevent escape of air from within the system when air pressure within the system is above atmospheric pressure.

2. A one-way air admittance valve assembly as set forth in claim 1, further comprising:
    a sealing weight positioned atop and sized smaller in diameter than said sealing member but larger than said valve seat, wherein said sealing weight is freely slidable atop said sealing member but larger than said valve seat to enhance sealing against air passage between said sealing member and said valve seat from the system into said second passageway.

3. In a one-way air admittance valve for connection to a plumbing system for venting ambient air into the system while preventing the escape of gases within the system, a valve structure comprising:
    a circular valve seat defining an opening demarking first and second passageways within a housing;
    a flat generally thin, flexible, resilient unsupported free-floating circular sealing membrane positioned for sealing by gravity only atop said valve seat;
    said sealing membrane being sized to slidably fit within the upright side wall of said housing wherein an uninterrupted sealing area located centrally on said sealing membrane remains in alignment over said valve seat as said sealing membrane is moved freely by air flowing within said upper portion of said housing;
    said valve structure being constructed and arranged whereby ambient air in said second passageway freely flows into said first passageway and the system through said opening when air pressure in the system is less than atmospheric pressure;
    said sealing member including spaced apertures formed therethrough positioned between the sealing area and a periphery of said sealing member for enhancing system airflow into said upper portion of said first passageway to seal said sealing member against said valve seat to prevent escape of air from within the system when air pressure within the system is above atmospheric pressure.

4. A one-way air admittance valve assembly as set forth in claim 3, further comprising:
    a sealing weight positioned atop and sized smaller in diameter than said sealing member but larger than said valve seat, wherein said sealing weight is freely slidable atop said sealing member but larger than said valve seat to enhance sealing against air passage between said sealing member and said valve seat from the system into said second passageway.

5. A one-way air admittance valve assembly for venting ambient air into a system while preventing the escape of gases within the system, comprising:
    a housing having first and second passageways in fluid communication one to another and a valve seat defining an opening demarking said first and second passageways;
    a cap sealingly engaged or engageable with an upper end of said housing defining an upper portion of said first passageway and being positioned above said valve seat;
    a flat generally thin, flexible, resilient sealing membrane positioned atop said valve seat for sealing thereof by gravity only;
    said sealing membrane being sized to freely slidably fit within the upright side wall of said housing which, in combination with said cap, defines said upper portion of said first passageway wherein an uninterrupted sealing area located centrally on said sealing membrane remains in alignment over said valve seat as said sealing membrane is moved freely by air flowing within said upper portion of said first passageway;
    whereby ambient air in said second passageway freely flows into said first passageway and the system through said opening when air pressure in the system is less than atmospheric pressure;
    said sealing member including spaced notches formed into a periphery thereof and extending radially inwardly toward, but not to, the sealing area for enhancing system airflow into said upper portion of said first passageway to seal said sealing member against said valve seat to prevent escape of air from within the system when air pressure within the system is above atmospheric pressure.

6. In a one-way air admittance valve for connection to a plumbing system for venting ambient air into the system while preventing the escape of gases within the system, a valve structure comprising:
    a circular valve seat defining an opening demarking first and second passageways within a housing;
    a flat generally thin, flexible, resilient unsupported free-floating circular sealing membrane positioned for sealing by gravity only atop said valve seat;
    said sealing membrane being sized to slidably fit within the upright side wall of said housing wherein an uninterrupted sealing area located centrally on said sealing membrane remains in alignment over said valve seat as said sealing membrane is moved freely by air flowing within said upper portion of said housing;

said valve structure being constructed and arranged whereby ambient air in said second passageway freely flows into said first passageway and the system through said opening when air pressure in the system is less than atmospheric pressure;

said sealing member including spaced notches formed into a periphery thereof and extending radially inwardly toward, but not to, the sealing area for enhancing system airflow into said upper portion of said first passageway to seal said sealing member against said valve seat to prevent escape of air from within the system when air pressure within the system is above atmospheric pressure.

\* \* \* \* \*